P. CLERGET.
PITMAN FOR ROTARY RADIAL MOTORS.
APPLICATION FILED MAR. 20, 1918.

1,305,194.

Patented May 27, 1919.
5 SHEETS—SHEET 1.

P. CLERGET.
PITMAN FOR ROTARY RADIAL MOTORS.
APPLICATION FILED MAR. 20, 1918.

1,305,194.

Patented May 27, 1919.
5 SHEETS—SHEET 5.

Inventor
Pierre Clerget
Attorney.

UNITED STATES PATENT OFFICE.

PIERRE CLERGET, OF LEVALLOIS-PERRET, FRANCE, ASSIGNOR TO CLERGET, BLIN & CIE., OF LEVALLOIS-PERRET, FRANCE, A COMPANY ORGANIZED ACCORDING TO FRENCH LAW.

PITMAN FOR ROTARY RADIAL MOTORS.

1,305,194.  Specification of Letters Patent.  Patented May 27, 1919.

Application filed March 20, 1918. Serial No. 223,680.

*To all whom it may concern:*

Be it known that I, PIERRE CLERGET, a citizen of the Republic of France, and resident of Levallois-Perret, Seine, France, have invented certain new and useful Improvements in Pitmen for Rotary Radial Motors, of which the following is a specification.

In multi-cylinder rotary engines, the system of connecting-rod coupling which consists in connecting the auxiliary connecting-rods to a master connecting rod, has the disadvantage that the center of the crank pin of the master connecting rod describes a regular circle while the centers of the crank pin journals of the auxiliary connecting rods describe irregular and different curves, the result being that the upper ends of the stroke are not the same in the auxiliary connecting rod cylinders as in the master connecting rod cylinder and that consequently the compression is not the same in all the cylinders.

The present invention has for its object to overcome this disadvantage and consists essentially in so coupling the connecting rods as to cause all the pistons to have the same length of stroke and so that the upper dead points or dead points at the end of the compression stroke coincide.

The invention consists essentially of three arrangements of methods of connecting rod coupling, by which the compression is complete and the same in all the cylinders and may be effected as follows:—

(*a*) By increasing the length of the radii of eccentricity of the auxiliary connecting rods relatively to the master connecting rod.

(*b*) By displacing the journals of the auxiliary connecting rods at different angular distances.

(*c*) By varying the length of the connecting rods, the radius of eccentricity as well as the angle of two consecutive journals being constant.

The accompanying drawings illustrates the invention by way of example.

Figure 1 represents diagrammatically the curves described by the crank pins of the master connecting rod and the auxiliary connecting rods in arrangements as hitherto known.

Figs. 2, 3 and 4 indicating the particular characteristics of three solutions hereinafter described.

Figure 1:
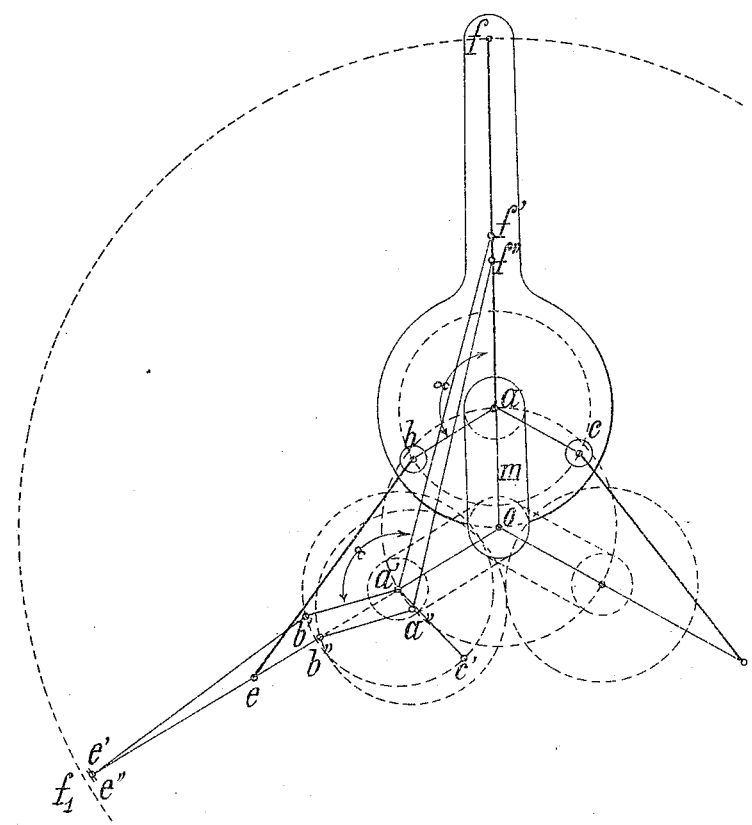

Considering Fig. 1 of the drawings, it will be seen that the point $a$ which is the center of the crank pin of the master connecting rod in the usual arrangement describes with the crank $m$ a regular circle about the center $o$ while the points $b$, $c$ which are the centers of the journals of the two auxiliary connecting rods (in the case of a three cylinder engine for example) describes irregular curves about the said center $o$. It follows that these auxiliary connecting rods have different strokes and that the compression is not the same in each cylinder. Thus for example, after a third of a revolution of the engine, the journal $b$ having reached the point $b'$ causes by its position a shortening $f_1$, $e'$. A shortening $f_1$, $e''$ again exists when the auxiliary connecting rod is in the axis of the cylinder at the point $b''$. Consequently the upper dead points coinciding at the end of the upper stroke of the pistons of the auxiliary connecting rods do not coincide and the compression is not the same in the cylinders provided with the auxiliary connecting rods.

Figure 2:
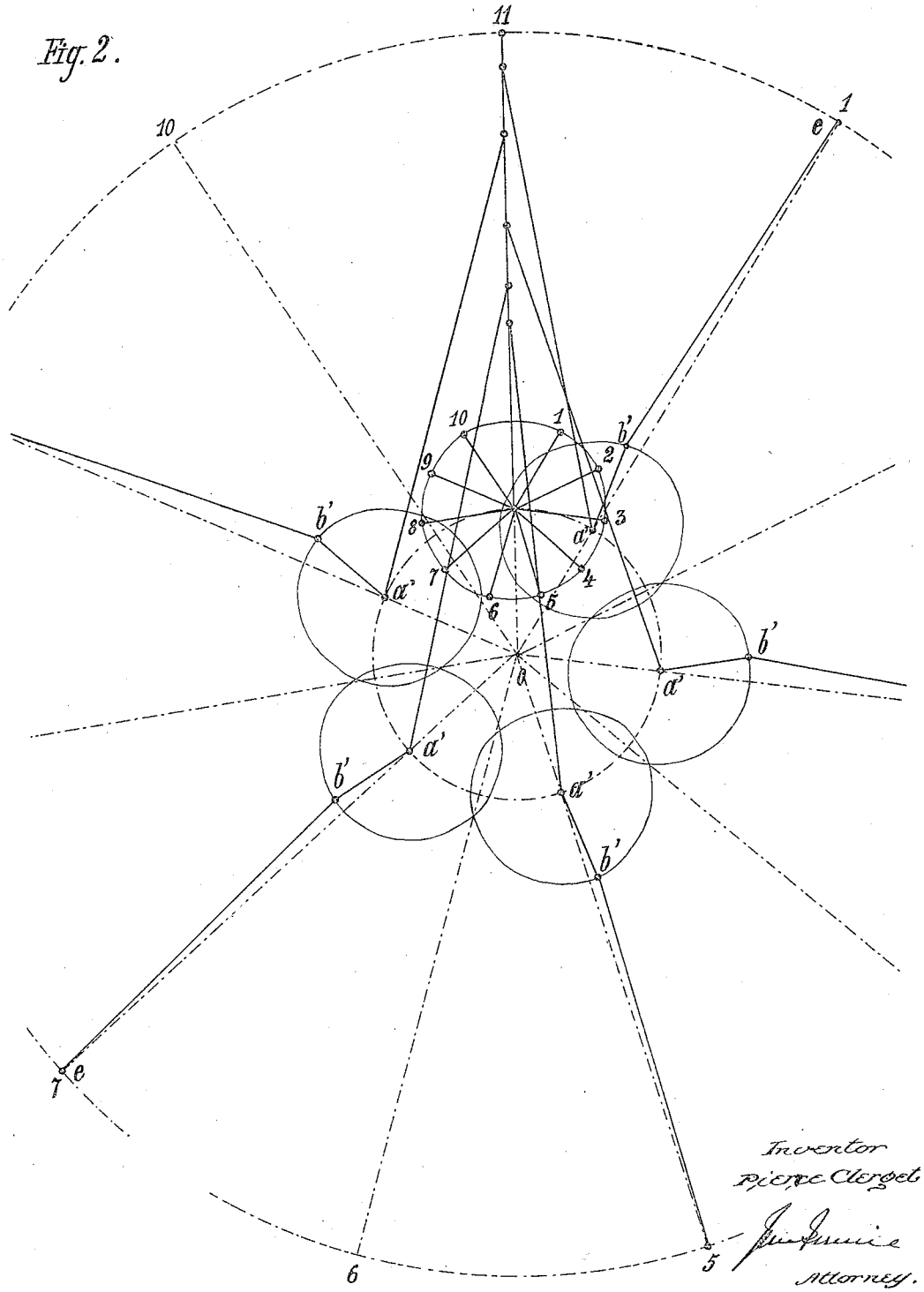
Figure 3:
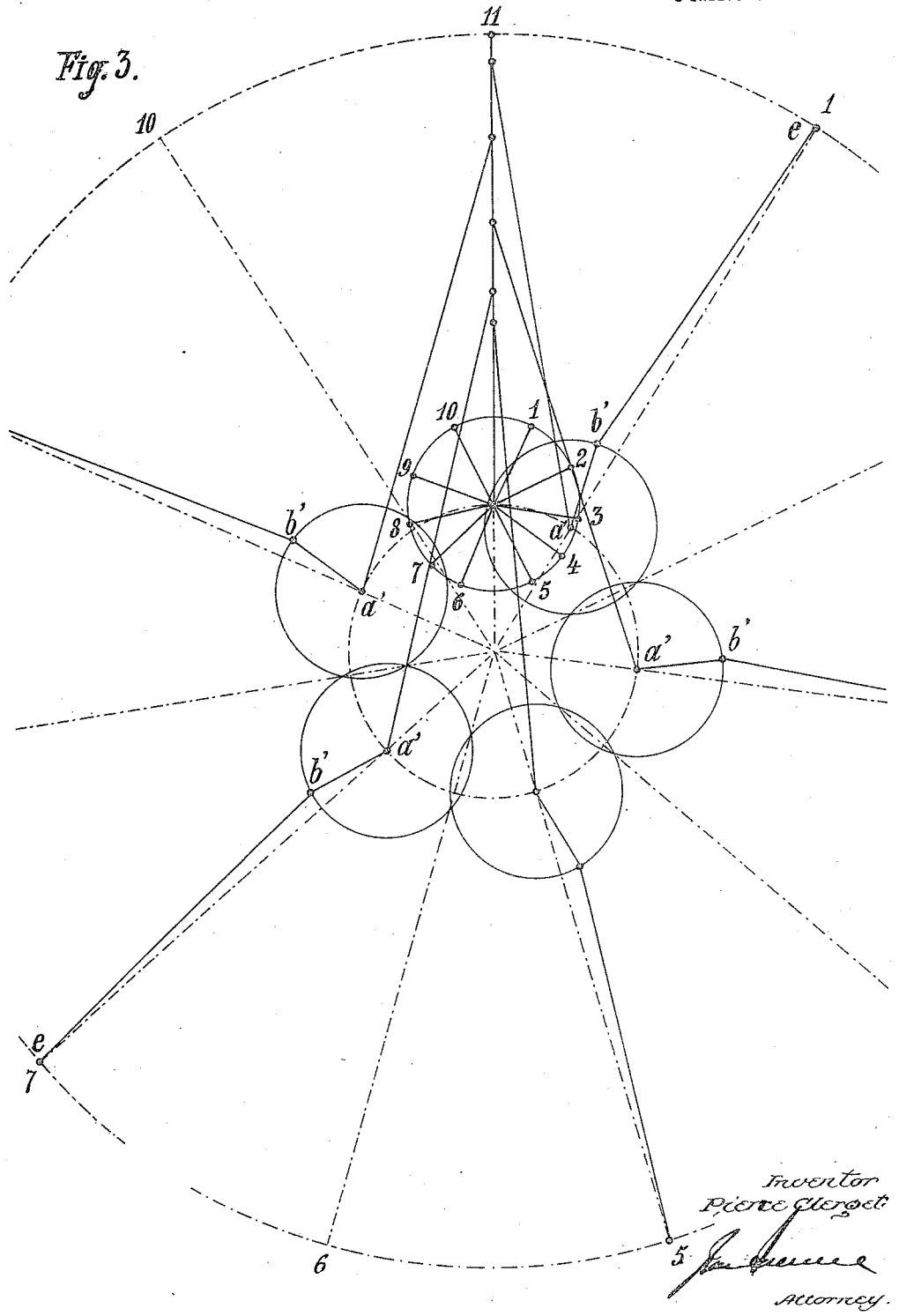
Figure 4:
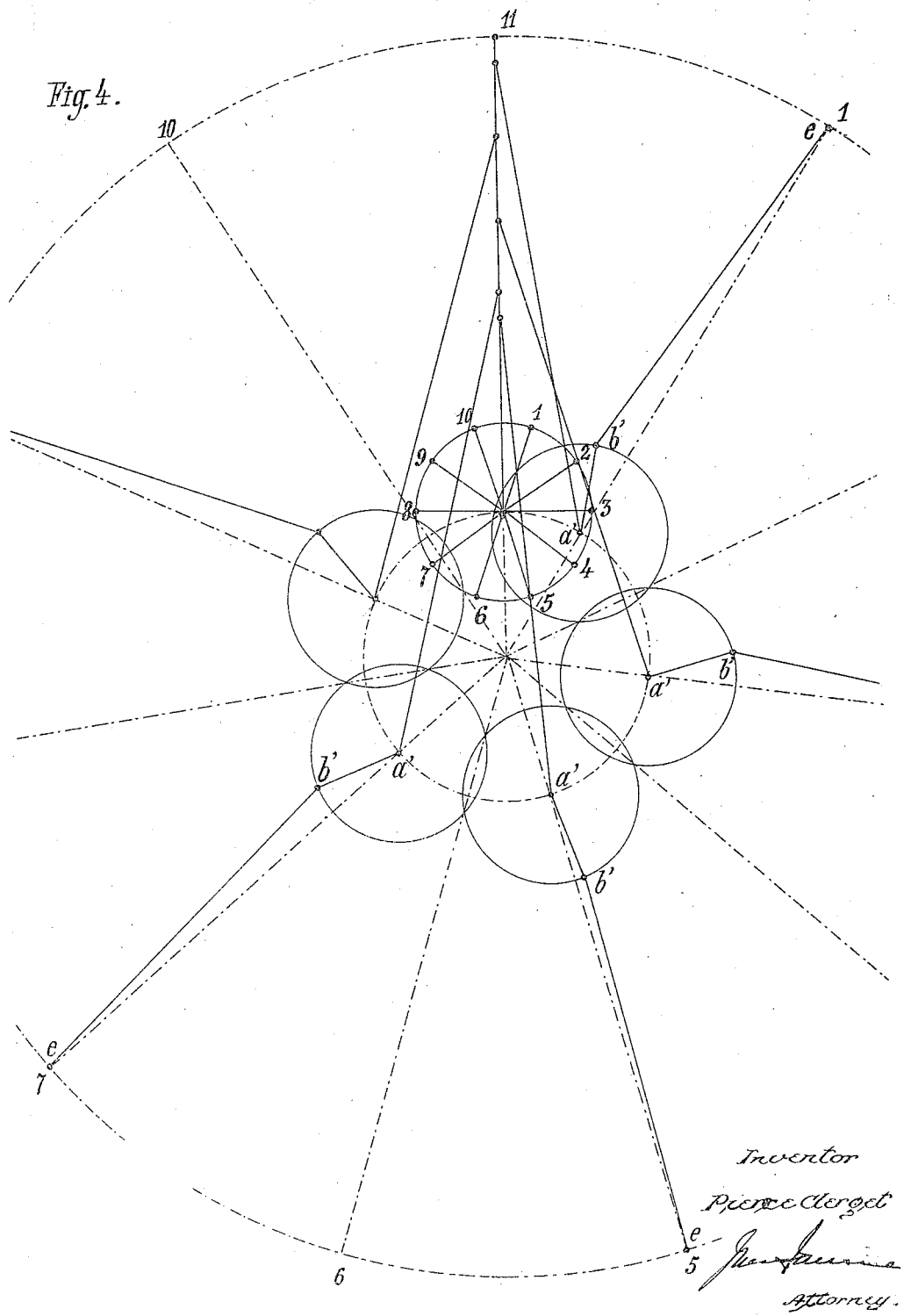

According to the diagrams of Figs. 2, 3 and 4 which represent the three solutions of the problem according to the present invention, we can after examining the triangle $a'$ $b'$ $e$ formed by the top dead point in each cylinder by the rod $b'$ $e$, the axis $a'$ $e$ of the cylinder, and the axis of the journal $b'$ passing through the center $a'$, maintain the distance $a'$ $e$ constant by one of the three following constructions:

(*a*) Varying the length $a'$ $b'$ of the radii of eccentricity, Fig. 2. In this case the length of the connecting rods as well as the angle of two consecutive journals are constant, but the angle $e\ b'\ a'$ varies for each new position of the rods in their respective cylinders, and therefore indicate the traces corresponding to the positions 1, 3, 5, 7 and 9 in Fig. 2.

(b) By varying the angle of two consecutive journals Fig. 3 and in this case keeping constant the length $b'\ e$ of the rod, the radius $a'\ b'$ of eccentricity and the angle $e,\ b'\ a'$.

(c) By varying the length $b'\ e$ of the rod Fig. 4.

In this latter case the radius of eccentricity $a'\ b'$ is constant, as well as the angle of two consecutive journals, but the angle $e\ b'\ a'$ varies equally for each new position of the rods.

Figure 5:
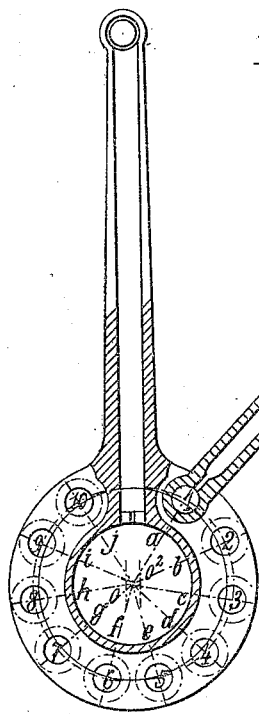
Fig. 5 is a diagrammatic illustration of a construction in accordance with the solution set forth under (*a*) above which consists in increasing the length of the radii of eccentricity of the auxiliary connecting rods relatively to that of the master connecting rod.

Fig. 5 represents a first constructional form corresponding to the diagram of Fig. 2, for an engine having eleven cylinders in which the journals of the auxiliary connecting rods are situated on arcs of circles of which the centers $o'$, $o^2$ are a certain distance on both sides of the center of the master connecting rod head, the angles of two consecutive journals being equal both to one eleventh of the circumference.

Figure 6:
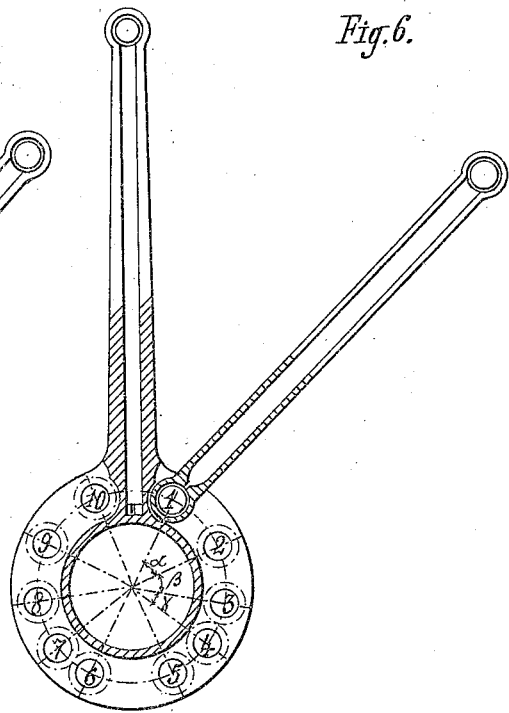
Fig. 6 represents diagrammatically a constructional form according to the solution set forth under (*b*) which consists in setting the journals of the auxiliary connecting rods at different angular distances apart.

Fig. 6 represents the second construction corresponding to the diagram of Fig. 3 and consisting in setting the consecutive journals of the auxiliary connecting rods at different angular positions.

In the arrangement represented in Figs. 3 and 6 the auxiliary connecting rods are articulated on journals situated concentric with the center $a$, the angular position having a different value for each journal, but determined for each cylinder, so that in the position of the top dead point, the triangles $a'\ b'\ e$ Fig. 3 may be equal.

The area of these triangles may be varied from zero to a maximum, the two limits being determined practically which allows of the connecting rod journals being disposed with facility on the same circumference.

Fig. 6 represents a construction for an engine having eleven cylinders, on the master connecting rod of which the ten journals of the auxiliary connecting rods 1, 2, 3, 4, 5 etc. are arranged at equal distances from the center $a$ and such that the angles $\alpha$, $\beta$, $\gamma$, etc., may be different and so that they compensate for the differences which exist in the ordinary or usual coupling arrangement, in so far as concerns the area of the triangle formed at the end of the compression by the rod, its radius of eccentricity and the axis of the cylinder.

Figure 7:
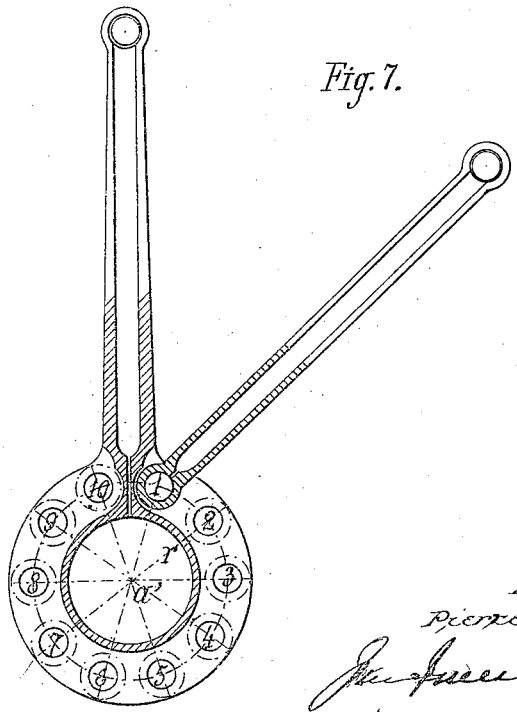
Fig. 7 represents diagrammatically a construction according to the solution (*c*) hereinbefore set forth, and which consists in varying the length of the connecting rods, the radius of eccentricity and the angle of two consecutive journals remaining constant.

In the third constructional form shown in Fig. 7, the invention is carried out by varying the length of the connecting rods.

In this case which corresponds to the diagram of Fig. 4, the journals of the auxiliary connecting rods are disposed concentric with the center $a'$, their angular distance apart being in accordance with their number, apart from the master connecting rod, each cylinder however having a connecting rod of different length.

Thus for example for an engine having eleven cylinders, comprising a master connecting rod on which are articulated the auxiliary connecting rods, the journals thereof are disposed apart at approximately one tenth of a revolution, on a circumference $r$ having its center at $a$, that of the master connecting rod; the position of the piston in each cylinder travels to the same top dead point as in the master connecting rod cylinder, by a correction of the length of the auxiliary connecting rod.

Thus the rods having the journals 2 and 9 will be longer than the rods having the journals 1, 3 8 and 10, and the latter rods longer than the rods 4 and 7, the rods 5 and 6 being of minimum length.

What I claim is:—

1. A compensated connecting rod coupling for rotary or radial internal combustion engines, comprising a master connecting rod provided at its inner end with a head, and auxiliary connecting rods articulated upon said head, said auxiliary connecting rods having ends thereof arranged at different relative positions with relation to said head.

2. A compensated connected rod coupling for rotary or radial internal combustion engines, comprising a master connecting rod provided at its inner end with a head, and auxiliary connecting rods articulated upon said head, said auxiliary connecting rods having their outer ends disposed at different distances from the center of the head.

3. A compensated connecting rod coupling for a rotary or radial internal combustion engines, comprising a master connecting rod provided at its inner end with a circular head having a central turning point, and auxiliary connecting rods pivotally connected at their inner ends with the head at points disposed near its periphery, the pivots forming a curved group which is eccentric with relation to the central turning point of the head and surrounds the same.

In testimony whereof I have hereunto signed my name.

PIERRE CLERGET.

Copies of this patent may be obtained for five cents each, by addressing the "Commissioner of Patents, Washington, D. C."